F. W. & A. B. CUTLER.
FRUIT GRADING APPARATUS.
APPLICATION FILED APR. 16, 1913.

1,093,836.

Patented Apr. 21, 1914.

WITNESSES
Victoria Lowden
Ida S. Clement

INVENTORS
Frank W. Cutler
Asa B. Cutler
BY
Aus Spear Jr.
ATTY.

COLUMBIA PLANOGRAPH CO., WASHINGTON, D. C.

UNITED STATES PATENT OFFICE.

FRANK W. CUTLER AND ASA B. CUTLER, OF HOOD RIVER, OREGON.

FRUIT-GRADING APPARATUS.

1,093,836. Specification of Letters Patent. Patented Apr. 21, 1914.

Application filed April 16, 1913. Serial No. 761,441.

*To all whom it may concern:*

Be it known that we, FRANK W. CUTLER and ASA B. CUTLER, citizens of the United States, residing at Hood River, county of Hood River, State of Oregon, have invented certain new and useful Improvements in Fruit-Grading Apparatus, of which the following is a specification.

This invention relates to fruit grading apparatus and particularly to a folding fruit bin adapted for use in conjunction with any type of fruit grading or sizing machine.

In the sorting of fruit considerable difficulty has been experienced by reason of the tendency of the fruit to back up at the point where the machine delivers it, thereby limiting the output of the machine to the quantity of fruit which the delivery board can accommodate. Inasmuch as nearly all the fruit grading machines feed by gravity alone it is not practical to drop the fruit any distance because of the liability to bruise or scar it. The fruit, therefore, has been backed up in the bins but one layer deep, thus not only limiting the capacity of the machine, but furthermore requiring the almost constant attention of the operative.

To overcome this objection and to materially increase the output of fruit grading machines, we have devised our present invention, in which we use a folding feed chute operating in each bin to prevent the fruit from backing up at the plane of delivery of the grader, and interfering with its operation as well as tending to injure the fruit.

We also aim to so arrange the fruit in the bins as to give the bins a much greater capacity and, moreover, to so construct the bins and coöperating parts as to reduce to a minimum the liability of injury to the fruit.

These and other important results which shall presently appear are secured by the use of the folding bins and operating mechanism described in the specification which follows.

In the drawings which form a part of that specification we have shown as an embodiment of our invention, a folding bin structure which we have found wholly satisfactory in practical use.

Figure 1:
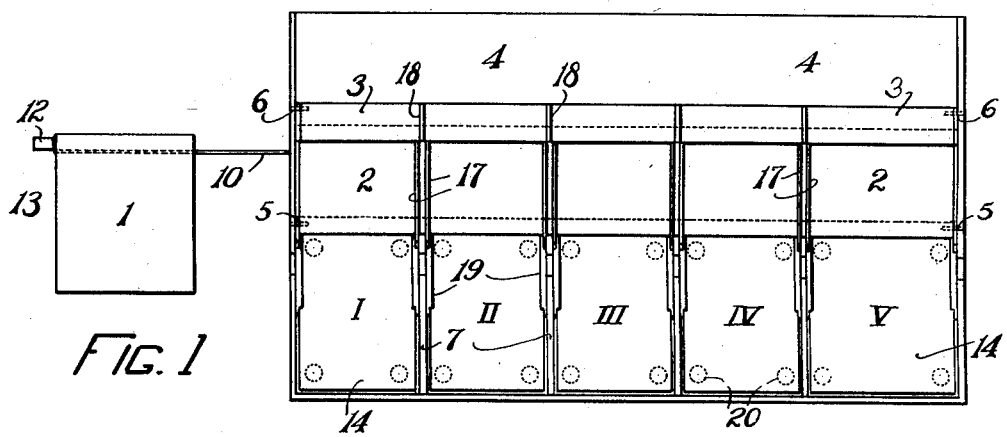
Figure 2:
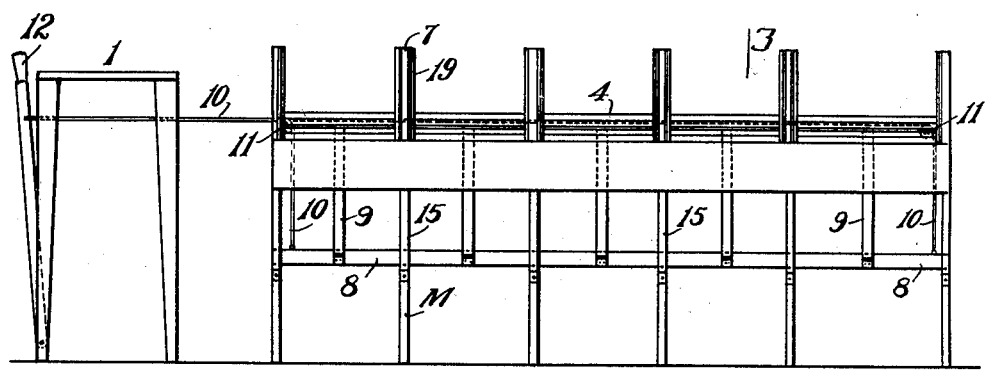

Throughout the specification and drawings like numerals of reference will indicate corresponding parts and in these drawings:

Figure 1 is a plan view of a series of bins of relatively graduated size in accordance with our invention. Fig. 2 is a side elevation thereof, and Fig. 3 is a vertical section on the line 3—3 of Fig. 2.

Figure 3:
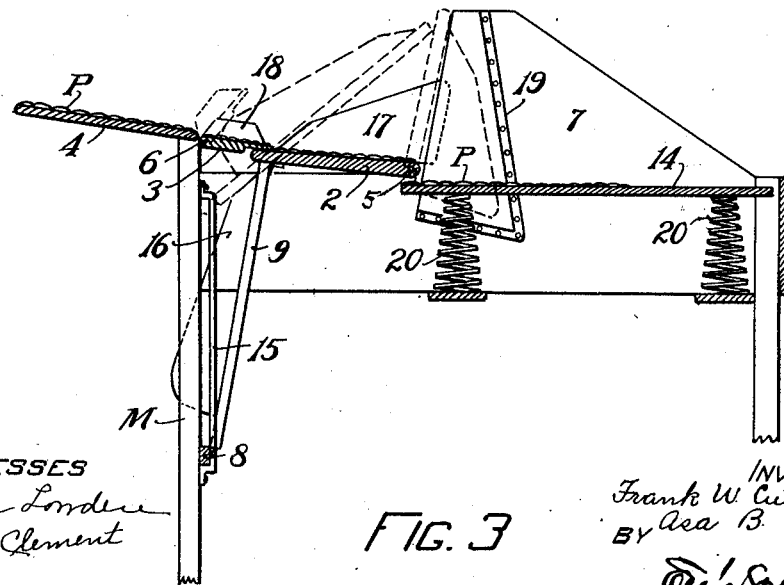

The structure thus illustrated comprises a plurality of bins graduated in capacity proportionately to the quantative fruit delivery from the fruit grading machine, the frame of which is indicated by the letter M in Fig. 3. These bins are indicated in Fig. 1 by the reference characters I, II, III, etc. The fruit grading machine delivers at the points marked 4 which points will be hereinafter termed the plane of delivery. The sorting table common to such machines is indicated by the numeral 1, and is disposed at one end of the machine with its operative facing the table at the point marked 13. Pivoted to the bins at 5 is a folding board 2 so arranged as to normally rest in the position shown in Fig. 3. This board is usually made in one piece and extends across the entire width of the bins. To prevent injury to the fruit as it is fed by gravity from the machine to said board, we preferably cover the board with a padding, usually some coarse material such as burlap, for instance. Overlying said board 2, and pivoted at 6 to swing upwardly is a similarly covered board 3, provided with side pieces 18 which divide the boards 3 of each bin from each other. The division boards 7 for the bins support the bearings for the pivots of the boards 2 and 3 and may also yieldingly support the bin bottoms 14, if desired, the construction of which bottoms, however, will be more fully described hereinafter. From this it will be seen that the board 4 (which may be padded as indicated at P, if desired), the board 3 and the board 2, form an inclined sectional chute to deliver the fruit from the grading machine to the bins 14.

In order to prevent the fruit from being pinched or otherwise marred between the folding board 2 and the division boards 7 other boards 17 are slidably mounted on the folding board 2 and slide on either side of the division boards 7, when said board 2 is lifted. These boards 17 work under cover of the canvas 19 so as not to bruise the fruit, as illustrated in dotted lines, Fig. 3.

To lift the folding board 2 we arrange a vertically movable bar 8 held in place against the legs M of the supporting frame by the pressure of the lifting rods 9 hinged thereto. This board is raised vertically by means of the connecting cables 10 operating over the pulleys 11 and connected to the operating lever 12 which is preferably located adjacent the sorting table 1 within the reach of the operative. Said lifting rods 9 are hinged to the folding board 2 near the center of that edge which swings about the pivot pin 5 and said rods serve, when actuated, to swing the folding boards upwardly into the dotted line position shown in Fig. 3. During this upward movement the bar 8 slides in a guide indicated at 15, Fig. 3, and the lifting rods 9 carry curved boards 16 whose function it is to engage the board 3 during the first upward movement of said rods and lift said board to its dotted line position, as indicated in Fig. 3, said boards 16 serving to maintain the board 3 in its raised position until the operating lever is released and the parts returned to their normal position. The fruit fed upon the folding chute thus formed feeds by gravity to the bin bottoms 14 which bottoms are preferably padded at the point P where the fruit will strike them. In order to regulate the drop of the fruit from the folding board 2 to the bin bottom we yieldingly support said bin bottoms relative to said board. A convenient manner for doing this is to set a coil spring 20 under each corner of the bottom. This regulates the drop in proportion to the quantity of fruit contained in the bin. When the bin is empty the springs will not be under compression and will exert their tension to maintain the bottom slightly below the pivot pin 5 of the folding board 2 so that there will be practically no drop from said board to the bottom, but as each successive layer of fruit is received into the bin the springs are gradually compressed and the bottom proportionately lowered. This increases the capacity of the bin materially and obviates any danger of the fruit being injured by dropping onto the bottom. We do not, however, limit ourselves to the use of coil springs supporting the bin bottom from underneath, but consider tension springs supporting the bottom from above, or other equivalents for yieldingly supporting said bottom, within the range of our invention.

The operation is substantially as follows: Fruit is delivered upon the padded plane 4 from the grading machine, being dropped from above. Inasmuch as the boards 4, 3, and 2 are inclined, the fruit will roll across said boards and drop upon the bin bottom 14 which, in the initial operation of the machine is being held upwardly by the expansion of the springs 20 to a point slightly below the plane of the folding board 2 to reduce the drop of the fruit to a minimum. The momentum attained by the fruit in its feed across the chute will carry it to the farthest end of the bin. As more fruit is received at the point 4 it will be deposited on the bin bottom until said bottom is covered one layer deep. Fruit delivered after this condition is reached, will roll across the board 2 and form a second layer of fruit for a short distance only beyond said board upon the bin bottom. When this condition is reached additional fruit received will be deposited upon the board 2 one layer deep, only, then in a similar manner upon the board 3 and finally upon the receiving plane 4. If this condition is permitted to continue, the fruit will back up on said plane and tend to interfere with the operation of the machine with a resultant injury to the fruit. To prevent such condition arising, the operative, who is stationed at some position where he can observe the feed of the fruit, operates the lever 12, causing the bar 8 to be raised vertically and swinging the board 2 in all of the bins about its pivot points 5. At the same time the upward movement of the lifting rods 9 will cause the board 3 to swing upwardly upon its pivot 6 to form a gate to prevent any feed of fruit while the board 2 is in its raised position. The movement of the parts is indicated in dotted lines, Fig. 3 and the fruit which has been deposited upon the board 2 will be raised and gently rolled upon the fruit already in the bins. The fruit on the board 3 in any division will be held from moving forward by the upward swinging of said board and will also prevent further feed from the plane 4. The parts thus moved are returned to their original positions by their own weight when the lever 12 is released and the fruit which has been held back on the board 3 will roll onto board 2 and from thence into the bins. This operation is repeated whenever the operative notices that the fruit has again backed up on the chute. When the crowding point has been reached in any bin, that is, when that point has been reached at which fruit will no longer feed, this particular bin should be emptied of its contents, as otherwise the fruit will be liable to injury. This folding device may be adapted to any type of bin, it being only necessary that the folding board 2 shall conform to the curvature or the width of the bin, and should it be found desirable, a board 2 can be arranged for each separate bin and each board may have its individual operating lever.

Various other modifications in the construction and form of our invention, coming within its spirit and scope may obviously be resorted to if found within the limits of the appended claims.

What we therefore claim and desire to secure by Letters Patent is:

1. In a device of the class described a fruit delivery chute, a receiving compartment, and a sectional feed chute establishing communication therebetween, said chute sections being pivoted to move in different directions, and means to simultaneously operate said sections.

2. In a device of the class described a fruit delivery chute, a receiving compartment, and a sectional feed chute establishing communication therebetween, said chute sections being pivoted to move upwardly in opposite directions, and means to simultaneously operate said sections.

3. In a device of the class described a fruit delivery chute, a receiving compartment and a sectional folding feed chute establishing communication therebetween, said chute sections being pivoted to move in different directions, vertically movable lifting members operatively connected to said chute sections, a cross piece connecting said members at their free ends, and an operating lever operatively connected with said cross piece to effect the movement of said chute sections.

4. In a device of the class described a fruit delivery chute, a gravity feed, and a receiving compartment, said compartment having a stiff receiving plane padded at the point of fruit delivery.

5. In a device of the class described a fruit delivery chute, a gravity feed, and a receiving compartment, said compartment having a stiff receiving plane padded at the point of fruit delivery, and springs yieldingly supporting the bottom of said compartment.

6. In a device of the class described, a fruit delivery chute, a receiving compartment, and a communicating sectional feed chute therebetween, an operating member operatively connected to one of said sections and carrying a contact piece positioned for engagement with an adjacent chute section, and means effective to operate said operating member.

7. In a device of the class described a fruit delivery chute, a receiving compartment, and a communicating sectional feed chute therebetween, a vertically movable lifting rod operatively connected to one of said sections and carrying a contact piece positioned for engagement with an adjacent chute section, and means effective to operate said lifting rod.

8. In a device of the class described, a fruit delivery chute, a receiving compartment, and a communicating sectional feed chute therebetween, the sections of which are movable in opposite directions, an operating member operatively associated with said sections, a lever and connections effective to operate said operating member, and division pieces for each section movable in opposite directions of travel.

9. In a device of the class described a fruit delivery chute, a receiving compartment, a sectional feed chute for putting said elements in communication, and a receiving plane in said compartment yieldingly supported relative to the feed chute.

In testimony whereof we affix our signatures in presence of two witnesses.

FRANK W. CUTLER.
ASA B. CUTLER.

Witnesses:
J. M. SCHMELTZER,
P. M. MORSE.